(12) United States Patent
Ransom

(10) Patent No.: US 7,369,054 B2
(45) Date of Patent: May 6, 2008

(54) RE-CHECK ALERT SYSTEM

(76) Inventor: Katrina Lanetta Ransom, 10205 Lone Pine La., Ft. Worth, TX (US) 76108

( * ) Notice: Subject to any disclaimer, the term of this patent is extended or adjusted under 35 U.S.C. 154(b) by 92 days.

(21) Appl. No.: 10/962,804

(22) Filed: Dec. 20, 2004

(65) Prior Publication Data

US 2006/0049951 A1    Mar. 9, 2006

Related U.S. Application Data

(60) Provisional application No. 60/607,800, filed on Sep. 8, 2004.

(51) Int. Cl.
*G08B 17/00* (2006.01)
(52) U.S. Cl. .................. 340/585; 340/431
(58) Field of Classification Search .......... 340/431, 340/825.69, 825.72, 425.5, 988, 585, 438, 340/501, 584; 346/33 TP; 374/186
See application file for complete search history.

(56) References Cited

U.S. PATENT DOCUMENTS

| 4,024,495 | A | | 5/1977 | O'Brien |
| 4,385,289 | A | * | 5/1983 | McMillan ................ 340/585 |
| 4,938,495 | A | * | 7/1990 | Beasley et al. ........... 280/477 |
| 5,424,720 | A | * | 6/1995 | Kirkpatrick ............... 340/585 |
| 5,607,221 | A | * | 3/1997 | Justus ...................... 362/485 |
| 5,775,712 | A | * | 7/1998 | Link et al. ................ 280/422 |
| 6,536,930 | B1 | * | 3/2003 | Hirmer .................... 362/540 |
| 6,737,962 | B2 | * | 5/2004 | Mayor ..................... 340/431 |

* cited by examiner

Primary Examiner—Anh V. La

(57) ABSTRACT

A warning indicator device installed in the tractor to give a driver an internal warning of a refrigerated trailer malfunction. This includes an internal warning indicator fault speaker and a red laminated light to be mounted on the lower part of the dashboard of the tractor, a 5-plug sensor input, a 5-prong output, a pigtail, a metal bar to secure the pigtail and fittings all made from a variety of materials.

14 Claims, 2 Drawing Sheets

RE-CHECK ALERT SYSTEM

This application claims the benefit of the prior filing date of U.S. provisional patent application No. 60/607,800, filed Sep. 8, 2004.

BACKGROUND OF THE INVENTION

1. Field of the Invention

The present invention relates generally to alerting a driver of a malfunction of a reefer with an internal warning system indicator. This invention is an attachment for an existing product wherein the existing product is the existing warning indicator typically found on existing refrigeration trailers known in the art and the attachment is an internal warning system inside the cab of a truck.

2. Description of the Related Art

One problem with the past malfunction indicator is that the driver can only detect a malfunction in the reefer if he or she has a view of the front of the refrigerated trailer.

Drivers have an extra safety device. Many times a reefer will have a code or a light, which has gone unnoticed. This could be due to many factors; a driver not detecting the problem (inexperienced), a driver not paying attention or a driver simply taking his or her government DOT required time off in the sleeper.

Many times drivers detect malfunctions by the sound of a reefer while the drivers are in the sleeper. A reefer will run continuously or simultaneously. A reefer can give a false indication that it is working properly. Many times a driver will hear a reefer running but not know or notice that the unit is not cooling.

Many problems do arise without the driver not knowing causing severe risk to products, which harms the public. The liability expense is estimated in the thousands. This has been a great concern to companies as well as insurance institutes.

Problems gone unnoticed or detected too late is a growing burden. If a driver does not have a view or knowledge of a problem, the driver would believe or assume the reefer is operating in the manner that it should.

On an existing refrigeration trailer as is known in the art, there is an existing warning indicator. The existing warning indicator gives only a visual that the reefer is or isn't working properly. This system shows a code and a light at the front of the trailer. This able the driver to see that there is a malfunction so the driver is able to get out of the truck and reset the reefer to correct the problem, and or take the reefer to a shop for repairs.

Accordingly, it is the objective of this invention to provide drivers, companies and institutes with an extra safety system. This system will warn a driver within the cab of a malfunction with a refrigerated trailer.

SUMMARY OF THE INVENTION

The invention is a warning indicator device installed in the tractor to give a driver an internal warning of a refrigerated trailer malfunction. This includes a internal warning indicator fault speaker and a red laminated light to be mounted on the lower part of the dashboard of the tractor, a 5-plug sensor input, a 5-prong output, a pigtail, a metal bar to secure the pigtail and fittings all made from a variety of materials.

BRIEF DESCRIPTION OF THE DRAWINGS

The accompanying drawings illustrate the invention. In such drawings.

DETAILED DESCRIPTION OF THE INVENTION

Figure 1:
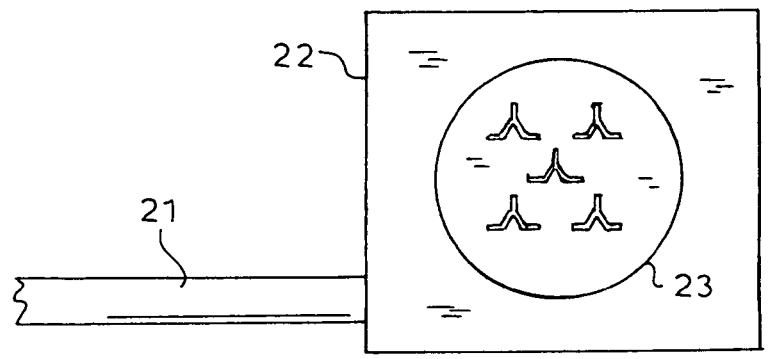
FIG. 1 is a perspective view of the invention, illustrating the extension cord (21) that will connect to the existing indicator as described, illustrating a front view (22) of the protective box, illustrating the 5-plug sensor input (23) as described in the invention.
Figure 2:
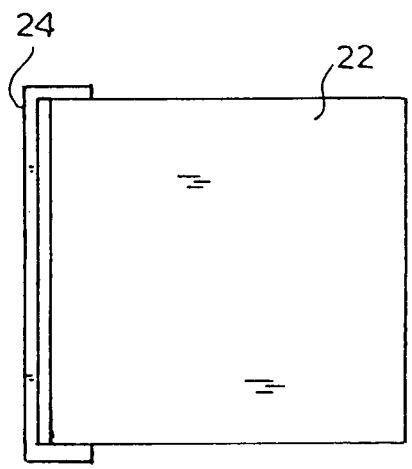
FIG. 2 is a side view of the metal protective flap (24) as described in the invention.
Figure 3:
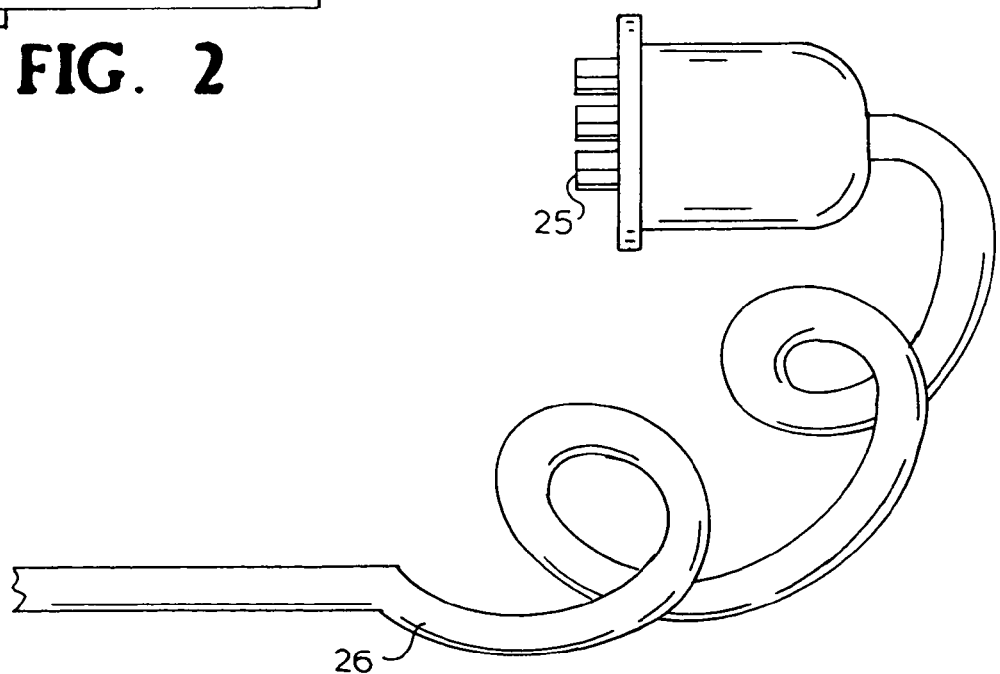
FIG. 3 is a side view of the 5-prong output (25) that will connect to the reefer, and illustrates the pigtail (26) that will consist of a spiral/straight form as shown.

The preferred embodiment of the present invention is a fault speaker and a red laminated warning light. A 5-plug sensor input attaches to the existing warning indicator on an existing trailer as is known in the art and the 5 plug sensor input would send a signal to the 5-prong output. This warning signal would be sent through a pigtail that would alert the driver through a warning flash of a red laminated light and a beep sound. Below is the full text of new paragraph without any markings.

The warning flash will alert first, 10 seconds after the warning flash alert the warning sound will alert. This will alert the driver inside the truck. The warning flash would continue to flash, the warning sound would continue every 10 seconds until the driver reset the existing indicator and or is able to take the unit (reefer) to the shop for repairs.

The internal warning system would only become active if the reefer is in the on position. This feature would function when connected to operating reefer. The 5-plug sensor input would operate from power of the existing warning indicator.

RECHECK ALERT SYSTEM would operate regardless if tractor were in off position. Alert light and sound will only operate when 5-prong pigtail is plugged into the existing warning indicator on an operating reefer, once reefer is in off position the alert system will not function.

The Pigtail will mount to trailer as do existing pigtail, brake line and air supply line.

An extension from an existing light indicator will send a signal to the internal warning indicator. An extension cord made of a variety of materials with a protective cover would connect to the pigtail input. The pigtail input will consist of a square box including a 5-plug sensor. The square box will have a metal protective flap.

The square box will be made of metal material. The protective flap will be an attachment to the outer surround of the pigtail input box. This as described above will become a fixture to the reefer.

The tractor will have a 5-prong output pigtail that will send the fault signal to the fault speaker and warning light unit, which will be installed in the cab of the tractor mounted on the lower dashboard.

The 5-prong output cord would route under the tractor, entering the cab of the tractor near the front of the dashboard.

An adaptor will connect the fault speaker and warning light unit inside the cab of the tractor. This adaptor will be made from a variety of materials. The adaptor will connect the output cord that entered the cab of the tractor.

The above invention as described will become a permanent or semi-permanent fixture inside the cab.

The fault speaker and warning light would be a one unit square box. The warning light would consist of a red circle laminated light. The fault speaker would have a moderate beep sound. This square box will have a mount on the back of it made of a variety of materials.

The Recheck Alert System is an excellent tool to help assist the growing need to lower cost in insurance claims due to damaged (spoiled) products. This system will give drivers a user-friendly monitoring device in case one of the described factors should occur. This system will alert a driver of a problem even while taking their required time off in the sleeper. This system will assist with the safety monitoring of products. Drivers will not have to worry about loads becoming damaged while being unable to see the existing indicator due to the many factors that have been described.

FIG. 1 is a perspective view of the invention, (21) illustrating the extension cord that will connect to the existing warning indicator on the existing refrigeration trailer as described, (22) illustrating a front view of the protective box, (23) illustrating the 5-plug sensor input as described in the invention.

Figure 4:
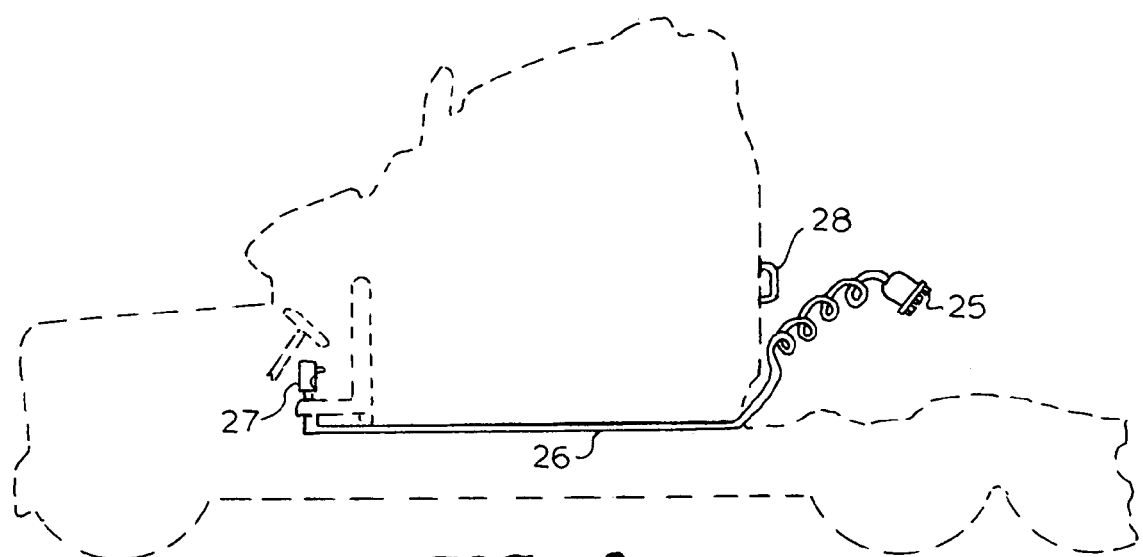
FIG. 4 is a side view of the tractor showing the installments of the invention, illustrating the red laminated warning light and fault speaker (27), a metal bar (28) that will secure the pigtail (26), the 5-prong pigtail output (25) installed on the tractor, so that the pigtail (26) that will route under the tractor into the bottom of the cab.

FIG. 4 is a side view of the tractor showing the installments of the invention, illustrating the red laminated warning light and fault speaker (27), a metal bar (28) that will secure the pigtail (26), the 5-prong pigtail output (25) installed on the tractor, so that the pigtail (26) that will route under the tractor into the bottom of the cab.

Figure 5:
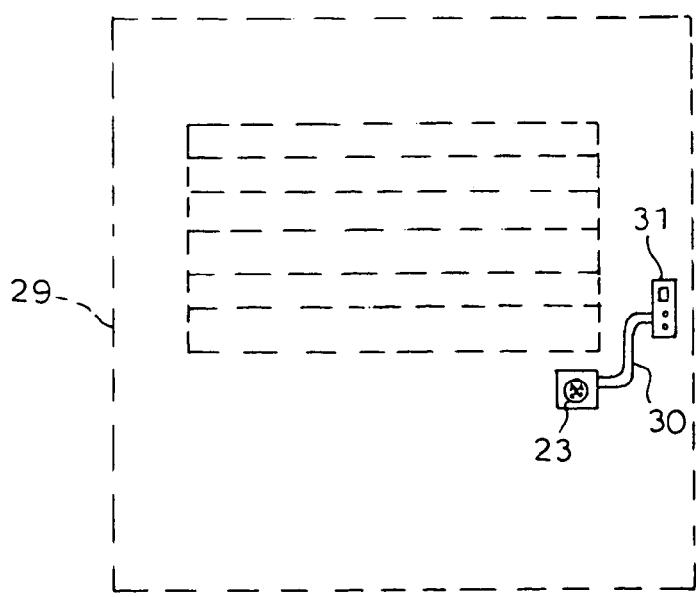
FIG. 5 a front view of a reefer (29), showing the 5-plug sensor input (23) installed on the reefer, the extension cord (30) that will connect the existing indicator to the 5-plug sensor, and the existing indicator (31) and reset button.

FIG. 5 a front view of a (29) reefer, (23) is a front view of the 5-plug input sensor installed on the reefer into the existing warning indicator, (30) is a view of the extension cord that will connect the existing indicator to the 5-plug sensor, (31) is a illustration of the existing indicator and reset button.

Having thus described the invention, what is claimed as new and desired to be secured by Letters Patent is as follows:

1. A method of providing a driver of a truck having a refrigerated trailer a warning of a malfunction with the refrigerated trailer wherein the warning is inside the cab of the truck, the method comprising the steps of:
   locating an existing warning indicator on the refrigerated trailer;
   connecting an outlet to the existing warning indicator;
   connecting the outlet to an internal warning system inside the cab of the truck wherein the internal warning system alerts the driver when there is a malfunction with the refrigerated trailer.

2. The method of claim 1 wherein the internal warning system is activated only when there is a problem with the refrigerated trailer that is detected by the existing warning indicator.

3. The method of claim 2 wherein the warning continues until the driver resets the existing indicator.

4. The method of claim 1 wherein the warning is an auditory warning.

5. The method of claim 4 wherein the auditory warning is given after a visual warning is given.

6. The method of claim 1 wherein the warning is a visual warning.

7. The method of claim 1 wherein the outlet is a 5-plug sensor input and the method further includes the steps of attaching a 5-prong output to the outlet wherein the 5-prong output is attached to a pigtail and the pigtail attaches to the internal warning system inside the cab.

8. The method of claim 7 wherein the pigtail extends from the refrigerated trailer, under the truck proximate to the existing brake line and air supply line of the truck, and into the cab of the truck near the front of the dashboard.

9. The method of claim 1 wherein the internal warning system is active only when the existing warning indicator is active.

10. A warning system inside the cab of a truck having a refrigerated trailer wherein the warning system warns the driver of a malfunction with the refrigerated trailer, the warning system comprising:
    an outlet operationally connected to an existing warning indicator on the refrigerated trailer;
    an internal warning system inside the cab of the truck operationally connected to the outlet wherein the internal warning system alerts the driver when there is a malfunction with the refrigerated trailer.

11. The warning system of claim 10 wherein the internal warning system is an auditory warning system.

12. The warning system of claim 10 wherein the internal warning system is an is a visual warning system.

13. The warning system of claim 10 wherein the outlet is a 5-plug sensor input and warning system further includes a 5-prong output attached to the outlet wherein the 5-prong output is attached to a pigtail and the pigtail is attached to the internal warning system inside the cab.

14. The warning system of claim 13 wherein the pigtail extends from the refrigerated trailer, under the truck proximate to the existing brake line and air supply line of the truck, and into the cab of the truck near the front of the dashboard.

* * * * *